(12) United States Patent
Kangas et al.

(10) Patent No.: US 8,085,704 B2
(45) Date of Patent: Dec. 27, 2011

(54) METHOD AND ARRANGEMENTS RELATING TO SATELLITE-BASED POSITIONING

(75) Inventors: Ari Kangas, Lidingo (SE); Karl Torbjorn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1294 days.

(21) Appl. No.: 11/577,073

(22) PCT Filed: Oct. 11, 2004

(86) PCT No.: PCT/IB2004/052040
§ 371 (c)(1),
(2), (4) Date: Apr. 11, 2007

(87) PCT Pub. No.: WO2006/040616
PCT Pub. Date: Apr. 20, 2006

(65) Prior Publication Data
US 2009/0028088 A1    Jan. 29, 2009

(51) Int. Cl.
*H04B 7/216* (2006.01)
(52) U.S. Cl. ......... 370/320; 370/328; 370/503; 375/354
(58) Field of Classification Search .................. None
See application file for complete search history.

(56) References Cited

U.S. PATENT DOCUMENTS

| | | | |
|---|---|---|---|
| 6,295,023 B1 | 9/2001 | Bloebaum | |
| 7,084,809 B2 * | 8/2006 | Hockley et al. | 342/357.48 |
| 7,876,738 B2 * | 1/2011 | Akopian et al. | 370/342 |
| 2002/0183070 A1 | 12/2002 | Bloebam et al. | |
| 2003/0151506 A1 * | 8/2003 | Luccketti | 340/539.13 |
| 2003/0187575 A1 | 10/2003 | King et al. | |
| 2004/0008138 A1 * | 1/2004 | Hockley et al. | 342/357.09 |
| 2004/0034471 A1 * | 2/2004 | Rorabaugh | 701/214 |
| 2004/0041728 A1 * | 3/2004 | Bromley et al. | 342/357.12 |
| 2004/0080454 A1 * | 4/2004 | Camp, Jr. | 342/464 |
| 2004/0198394 A1 * | 10/2004 | Syrjarinne et al. | 455/456.1 |

(Continued)

FOREIGN PATENT DOCUMENTS
WO   WO 2005/081010   9/2005

OTHER PUBLICATIONS

Navstar GPS Space Segment/Navigation user Interfaces, ICD-GPS-200, Revision IRN-200C-003, Oct. 11, 1999.

(Continued)

*Primary Examiner* — Bob Phunkulh

(57) ABSTRACT

The present invention relates to methods and apparatuses as well as a measurement report signal for reporting measurements on ranging signals (RS1-RS4) received by a mobile station from satellites (SV1-SV4) or calculating a position based on such measurements, wherein each of said ranging signal comprises a stream (201) of data bits (202) spread by a spreading code (203). After synchronizing (501) to data bit edges in the stream of data bits on a ranging signal, a position in time modulo the data bit length for said stream of data bits with respect to a selected point in time is measured (502). The measured position in time could be used by the apparatus performing the measurements on the received ranging signals for calculating (504) the position of the mobile station. Alternatively the apparatus could transmit (503) a wireless signal including data representing said measured position in time, allowing the mobile station position to be determined in another apparatus (101).

18 Claims, 6 Drawing Sheets

U.S. PATENT DOCUMENTS

| | | | |
|---|---|---|---|
| 2004/0209625 A1* | 10/2004 | Haddrell | 455/456.1 |
| 2005/0052318 A1* | 3/2005 | Jendbro et al. | 342/357.1 |
| 2005/0195789 A1* | 9/2005 | Akopian et al. | 370/342 |
| 2006/0022871 A1* | 2/2006 | Zimmerman | 342/464 |
| 2006/0022872 A1* | 2/2006 | Zimmerman | 342/464 |

OTHER PUBLICATIONS

Parkinson, Spilker Global Positioning System: Theory and Applications. vol. 1, AIAA, 1996.

* cited by examiner

US 8,085,704 B2

METHOD AND ARRANGEMENTS RELATING TO SATELLITE-BASED POSITIONING

TECHNICAL FIELD OF THE INVENTION

The present invention relates in general to positioning of mobile equipment by use of satellites and in particular to such positioning assisted by land based communication nodes.

DESCRIPTION OF RELATED ART

In recent years, determination of the geographic position of an object, equipment or a person carrying the equipment has become more and more interesting in many fields of application. One approach to solve the positioning is to use signals emitted from satellites to determine a position. Well-known examples of such systems are the Global Positioning System (GPS) (see e.g. [1]) and the coming GALILEO system. The position is given with respect to a specified coordinate system as a triangulation/trilateration based on a plurality of received satellite signals.

A stand-alone GPS receiver can obtain full locking to GPS satellite signals, without having any other information about the system except nominal carrier frequency and the rules by which data carried by the signals are modulated. Basically, the three-dimensional position as well as a receiver clock bias to the satellite time have to be determined in the position calculation step.

Assisted GPS (AGPS) has been defined as an enhancement of GPS (see e.g. 3rd Generation Partnership Project (3GPP) specifications TS 25.331 or TS 44.031 or Open Mobile Alliance (OMA) specifications for Secure User Plane Location (SUPL)) for integration of GPS receivers into user equipment, i.e. mobile stations, of cellular communication systems. Assisted GPS in general aims at improving the performance of GPS receivers in many different respects, including detection sensitivity, time to obtain a location estimate, accuracy and saving battery power. This is done by moving some functionality from the GPS receiver in the mobile station to the network and hence only performing a subset of the GPS tasks in the GPS receiver itself.

There are two types of AGPS, Mobile Station (or User Equipment) based and Mobile Station (or User Equipment) assisted. In Mobile Station based AGPS, the location of a mobile station is calculated in the mobile station using ranging signal measurement results determined by the mobile station together with assistance data provided by the network. In Mobile Station assisted AGPS (sometimes also referred to as Network based AGPS), the mobile station only measures and reports timing of received ranging signals reflecting the pseudoranges to the Space Vehicles (i.e. satellites). For both types of AGPS, the measured timing of the ranging signals are truncated modulo 1 ms which corresponds to a distance of 300 km. When calculating the mobile station location, either in the mobile station itself or in a network location server, the complete pseudoranges need to be reconstructed using apriori information about the mobile station location together with the ranging signal measurement results determined by the mobile station, in order to compute the precise mobile station location.

The inventors of the present invention have identified a problem with AGPS in that measuring and reporting truncated timing of received ranging signals may cause ambiguities when determining pseudoranges to space vehicles, if the precision of the apriori information about the mobile station position is too low, i.e. the uncertainty of the mobile station position in said apriori information is too large. As a result, if an incorrect pseudorange is selected and used as a basis for determining the location of the mobile station, there will be a significant error in the calculated mobile station position in the order of e.g. 100 km.

U.S. Patent Application No. 60/545,175 by one of the inventors of the present invention describes one way of addressing this problem involving discarding unlikely pseudo range values.

SUMMARY OF THE INVENTION

The problem dealt with by the present invention is providing increased robustness, in the context of satellite based positioning with assistance data, against ambiguous pseudorange reconstruction.

An advantage afforded by the invention is increased robustness against ambiguous pseudorange reconstruction in connection with satellite based positioning with assistance data such as Assisted GPS (AGPS).

Another advantage of the invention is that the increased robustness is achieved without reducing the detection sensitivity.

Yet another advantage of the invention is that the increased robustness is achieved with an insignificant increase in processing delays.

The invention will now be described in more detail with reference to exemplary embodiments thereof and also with reference to the accompanying drawings.

DETAILED DESCRIPTION OF THE EMBODIMENTS

Figure 1:
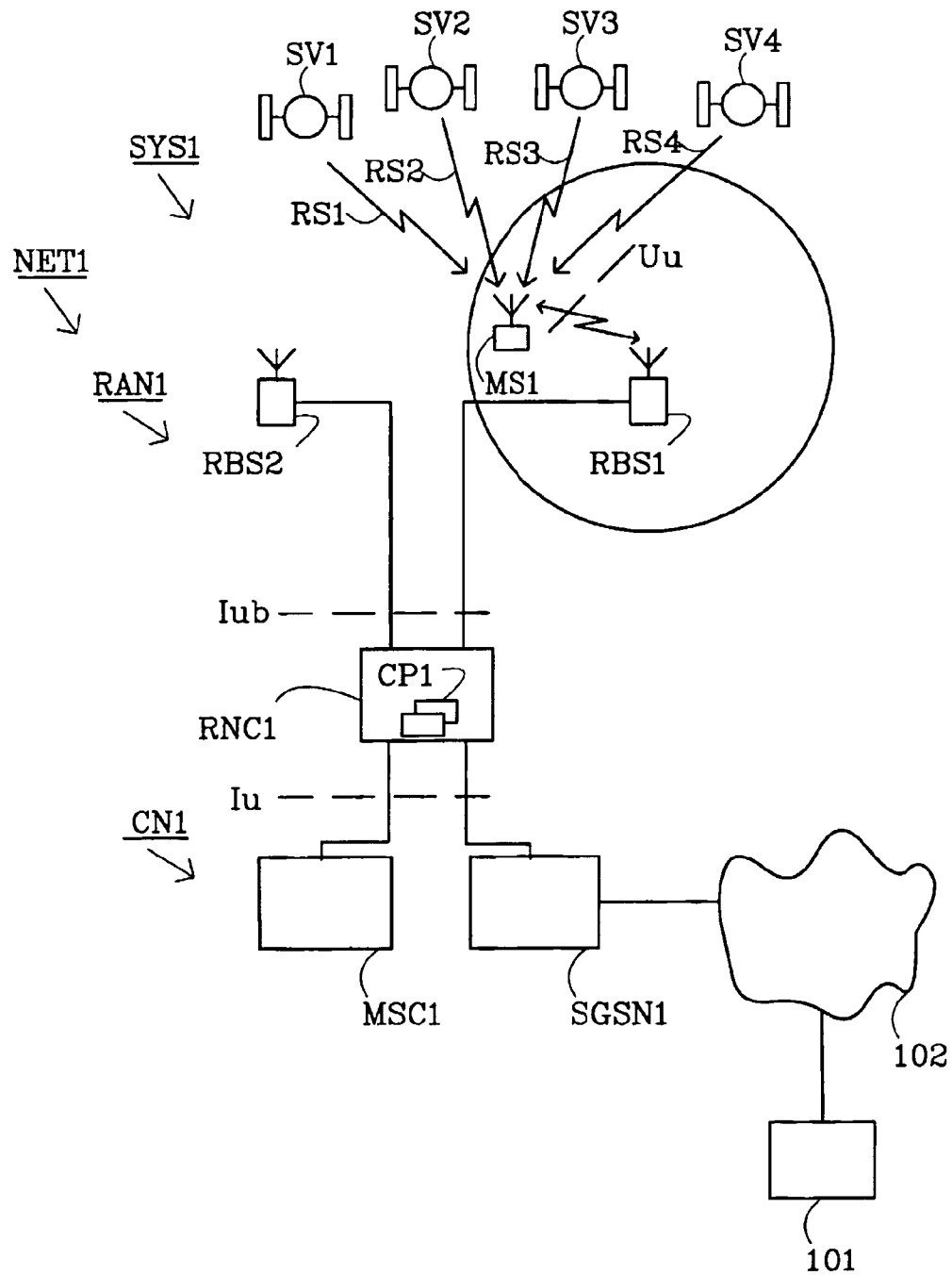
FIG. 1 is a schematic view of an example scenario of Mobile Station assisted AGPS in which the present invention is applied

FIG. 1 illustrates a non-limiting example scenario in which the present invention may be applied. In this example scenario a basic wireless communication system SYS1 together with the Global Positioning System (GPS) is used to provide Mobile Station assisted AGPS. The exemplary wireless communication system SYS1 illustrated in FIG. 1 is a Universal Mobile Telecommunication System (UMTS). The communication system SYS1 includes a network part NET1 and User Equipment (UE), alternatively referred to as mobile stations (MS). The network part NET1 comprises a core network CN1 and a UMTS Terrestrial Radio Access Network (UTRAN) RAN1. The core network CN1 includes a Mobile services Switching Center (MSC) node MSC1 that provides circuit-switched services and a General Packet Radio Service (GPRS) node SGSN1, sometimes referred to as a Serving GPRS Support node (SGSN), which is tailored to provide packet-switched type services.

Each of the core network nodes MSC1 and SGSN1 connects to the radio access network RAN1 over a radio access network interface referred to as the Iu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1. The interface between the radio network controller RNC1 and the base stations RBS1 and RBS2 is referred to as the Iub interface. Mobile stations, such as mobile station MS1 shown in FIG. 1, communicate with one or more radio base stations RBS1-RBS2 over a radio or air interface referred to as the Uu interface.

Each of the radio interface Uu, the Iu interface and the Iub interface are shown by dashed lines in FIG. 1.

In FIG. 1, the GPS system is represented by Space Vehicles, i.e. satellites, SV1-SV4. Each Space Vehicle SV1-SV4 transmits a corresponding ranging signal RS1-RS4. Please note that for sake of simplicity, only four Space Vehicles SV1-SV4 are illustrated in FIG. 1.

When determining the position of the mobile station MS1 in FIG. 1 using mobile station assisted AGPS, the mobile station MS1 receives assistance data from and reports measurement results to a location server 101. Based on the reported measurement results and apriori information on where the mobile station is located, the location server calculates the location of the mobile station MS1. Depending on how a location server is connected to a cellular network, AGPS can be divided into two categories, "control plane solutions to AGPS" and "user plane solutions to AGPS".

In "control plane solutions to AGPS", the location server functionality (which may be implemented in a separate location server node, sometimes referred to as a Serving Mobile Location Center (SMLC) or Standalone SMLC (SAS), or integrated together with other functionality in other network nodes such as radio network controllers) is tightly integrated with the cellular network and assistance data and measurement results are communicated using so called control plane signaling. This solution is further characterized in that typically the location server would receive information of in which cell a mobile station is currently operating and the location server would apply this information as the apriori location of the mobile station when calculating the location of the mobile station. Hence the uncertainty in the apriori location information corresponds to the cell size.

In "user plane solutions to AGPS", the location server functionality is less closely integrated with the cellular network and assistance data and measurement results are communicated using so called user plane signaling, i.e. ordinary user data packets are used to convey this information transparently to the cellular network. This solution is further characterized in that the location server would not receive information of in which cell a mobile station is located or at least would not always be able to associate a given cell identity with a specific geographical area corresponding to the area covered by the cell. Hence, for user plane solutions to AGPS, the uncertainty in the mobile station apriori location information may be significantly larger than the cell size and may correspond to e.g. the size of the country in which the mobile station is currently operating.

In the example scenario of FIG. 1, a user plane solution to AGPS is illustrated where the location server 101 is connected to the cellular network NET1 via an Internet Protocol (IP) based packet data network 102.

Figure 2:
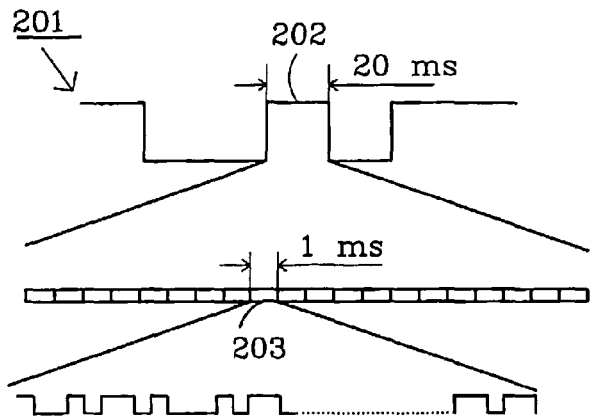
FIG. 2 is a diagram illustrating C/A code and navigation data bits in GPS ranging signals

The GPS Space Vehicles SV1-SV4 transmit ranging signals RS1-RS4 with a spectrum centered at 1575.42 MHz. FIG. 2 illustrates how each ranging signal RS1-RS4 includes a stream 201 of navigation data bits 202 that are spread by a spreading code defined by a so-called Coarse/Acquisition (C/A) code 203 that is unique for the Space Vehicle transmitting the signal. The C/A code 203 has a length of 1023 chips and a chip duration of $1/1.023 \times 10^6$ s, i.e. the C/A code comprises a sequence of +/−1 that changes at a rate of $1.023 \times 10^6$ Hz and repeats itself every 1 ms. The navigation bits 202 have a bit period of 20 ms, i.e. corresponding to 20 C/A code repetitions.

The navigation data includes among other things a set of so-called ephemeris parameters that enables the receiver to calculate the precise position of the satellites at the time of signal transmission. The precise time of transmission can also be read from the navigation data.

Figure 3:
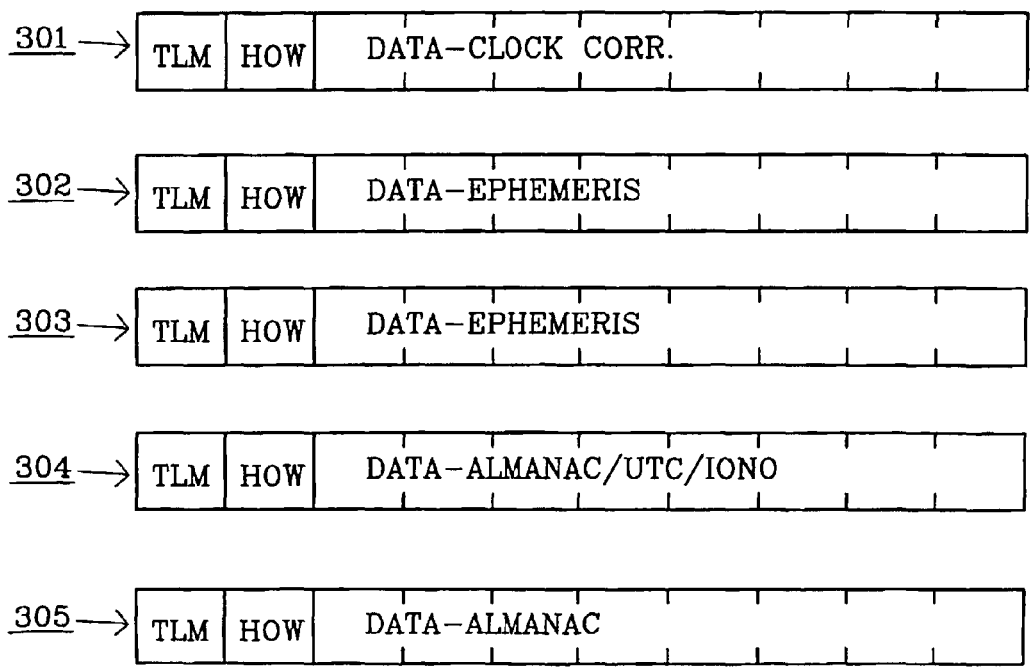
FIG. 3 is a block diagram illustrating the format of GPS navigation data in GPS ranging signals

FIG. 3 illustrates more in detail how the navigation data is further divided into 5 subframes 301-305, each of length 6 seconds. Each subframe 301-305 is divided into 10 words each of length 0.6 seconds and containing 30 data bits. A time stamp, GPS Time Of Week (TOW), is transmitted in the second word, the Handover Word (HOW), of every subframe 301-305. The indicated time is the time of transmission at the end of the subframe in question. The TOW is thus repeated every 6 seconds.

Each ranging signal RS1-RS4 basically defines a clock which is measured by the mobile station MS1. The clock indicates the time of signal transmission. If the mobile station MS1 knows the GPS system time, then the clock reading can directly be used to determine the time delay, and hence the range from the Space Vehicle transmitting the ranging signal to the mobile station MS1. By measuring three ranges and utilizing the knowledge about Space Vehicle locations at time of transmission, the location of the mobile station MS1 in three dimension can then be determined. However normally the mobile station MS1 does not have knowledge about precise GPS system time, so one more measurement is needed to eliminate the mobile station clock bias.

Figure 4:
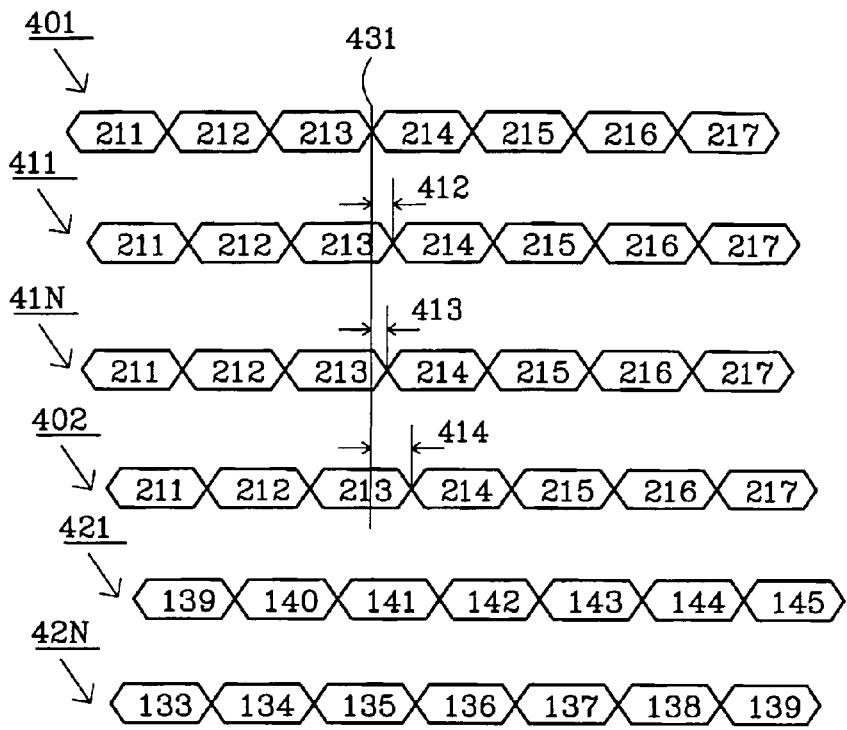
FIG. 4 is a diagram illustrating time in different parts of the system illustrated in FIG. 1

The sequences of FIG. 4 illustrate clock relations (expressed in milliseconds) for different parts of the system illustrated in FIG. 1. Each Space Vehicle SV1-SV4 carry precise atomic clocks to maintain clock stability. The Space Vehicle transmissions are however not perfectly synchronized to GPS system time as illustrated in FIG. 4. In FIG. 4, sequence 401 represents the GPS system time, sequence 411 represents the clock of Space Vehicle 1, sequence 41N represents the clock of Space Vehicle N, sequence 402 represents the clock of mobile station MS1 of FIG. 1 while sequences 421 and 42N respectively represent time as read in the ranging signals from Space Vehicle 1 and Space Vehicle N respectively received by the mobile station MS1. By drawing a vertical line 431 through the timing diagram one may obtain a snapshot of all clock readings as observed in various points in space. GPS system time 401 is defined as an ensemble average based on a set of ground station clocks and a subset of Space Vehicle clocks. As demonstrated in FIG. 4, the individual Space Vehicle clocks 411 and 41N and the mobile station clock 402 are slightly offset (see SV clock biases 412 and 413 and mobile station clock bias 414 respectively) compared to GPS system time 401. A model for the individual offsets of the Space Vehicle clocks is transmitted as part of the navigation message from each Space vehicle. When the signals reach a point on the earth surface (e.g. the current location of mobile station MS1), they have been delayed with an amount depending on the range from the Space Vehicle in question to said point on the earth surface. The delay is typically 60-85 milliseconds (ms) as illustrated by the clock readings in FIG. 4.

When determining the position of a mobile station using AGPS, the mobile station measures the C/A code boundary locations position in time with respect to a selected point in time, i.e. the C/A code phase, for the received ranging signals. The C/A code phase is determined modulo 1 ms (i.e. one C/A code period).

A mobile station implementing mobile station based AGPS calculates its position at the selected point in time based on the measured C/A code phases of the received ranging signals and assistance data (received from the network) including space vehicle ephemeris and clock correction data together with apriori information about the mobile station location.

A mobile station, such as mobile station MS1 in FIG. 1, implementing mobile station assisted AGPS instead transmits a wireless signal reporting the C/A code phases (expressed in terms of whole and fractional chips of the C/A code from the selected point in time until the beginning of the next C/A code repetition) for the received ranging signals together with an estimate of the GPS system time corresponding to the selected point in time. Based on the information reported by the mobile station and apriori information about the mobile station location, a location server, such as location server 101 in FIG. 1, either in the cellular network or in another network calculates the position of the mobile station.

The inventors of the present invention have recognized that the AGPS way of measuring the C/A code phases modulo 1 ms and hence characterizing each ranging signal by time mod 1 ms, causes problems when the uncertainty in the apriori information of the mobile station location is too large. As demonstrated in APPENDIX 1, when the apriori location uncertainty is more than 75 km, the so called pseudorange to a space vehicle can not be unambiguously reconstructed.

The problem of ambiguous pseudorange reconstruction due to truncated measurement of ranging signal timing in combination with too large uncertainties in apriori location could be addressed by having a mobile station measure ranging signal timing for each ranging signal without any truncation. This would however require decoding Time Of Week information on each measured ranging signal which significantly increases the processing delays and may also decrease the detection sensitivity of the GPS receiver integrated in the mobile station since it is significantly more difficult to decode the Time Of Week information than to detect the C/A code boundaries.

The present invention addresses the above elaborated problem by providing ways of significantly reducing the risk that, in the context of AGPS (both mobile station based and mobile station assisted AGPS), the apriori location uncertainty of a mobile station causes ambiguous pseudorange reconstruction. At the same time the invention also avoids the need for decoding Time Of Week on each measured ranging signal and the associated disadvantages.

Figure 5:
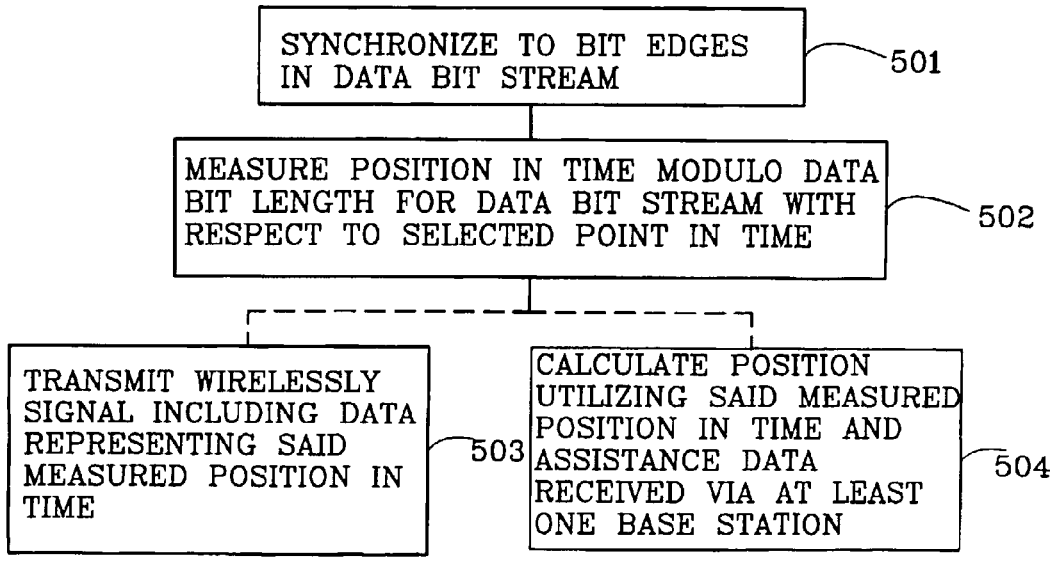
FIG. 5 is a flow diagram illustrating basic methods according to the invention for measuring ranging signals from satellites and calculating a position based on measurements on ranging signals from satellites respectively.

FIG. 5 illustrates basic methods according to the invention for reporting measurements on ranging signals received by a mobile station from satellites (i.e space vehicles) and for calculating a mobile station position based on such measurements respectively, wherein each of said ranging signals comprises a stream of data bits (e.g. the GPS navigation data bits) spread by a spreading code (e.g. the GPS Coarse Acquisition code). Both methods include performing steps 501 and 502 for at least one of the received ranging signals, while the last step of the basic methods differs.

At step 501, synchronizing to data bit edges in the stream of data bits is performed. This would typically involve determining/identifying data bit edge positions modulo the data bit length (i.e. modulo 20 ms for AGPS).

The position in time modulo the data bit length for the stream of data bits with respect to a selected position in time is measured at step 502.

After steps 501 and 502, the basic method for reporting measurements includes a further step 503 of wirelessly transmitting a signal including data representing said position in time measured at step 502.

After steps 501 and 502, the basic method for calculating the mobile station position includes a further step 504 of calculating said mobile station position utilizing said measured position in time for said stream of data bits with respect to said selected point in time and assistance data received by the mobile station via at least one base station of a wireless communication network. The received assistance data would include ephemeris parameters and clock corrections of the satellites transmitting the received ranging signals which makes it possible to calculate the position of the satellites at time of ranging signal transmission. The received assistance data would further include an apriori estimate of the mobile station position.

Typically said synchronizing and measuring steps 501 and 502 are performed for plural received ranging signals, preferably all detected ranging signals. The signal transmitted at step 503 would then include data representing the measured positions in time with respect to said selected point in time for each of said plural received ranging signals while the position calculation performed at step 504 would utilize the measured positions in time with respect to said selected point in time for each of said plural received ranging signals.

Embodiments of the basic method for reporting measurements including steps 501, 502 and 503 could e.g. be used to implement processing in a mobile station for supporting mobile station assisted AGPS where, based on the measurement results reported by the mobile station, the actual position calculations are performed in a node somewhere on the network side.

Embodiments of the basic method for calculating a mobile station position including steps 501, 502 and 504 could e.g. be used to implement processing in a mobile station for supporting mobile station based AGPS.

Applying the methods of FIG. 5 in the context of AGPS (either mobile station assisted AGPS or mobile station based AGPS) would cause a mobile station to measure timing of received ranging signals modulo 20 ms (as compared to modulo 1 ms for prior art AGPS). A 20 ms truncation enables unambiguous reconstruction of complete pseudoranges if the apriori uncertainty of the mobile station location is less than 1500 km (as compared to less than 75 km when applying the prior art 1 ms truncation).

First exemplary embodiments of a method and an apparatus for reporting ranging signal measurements implemented in the mobile station MS1 of FIG. 1 together with a first exemplary embodiment of an apparatus for position calculation according to the invention are illustrated in FIGS. 6-9. A first exemplary embodiment of a measurement report signal according to the invention is illustrated in FIG. 10.

Figure 6:
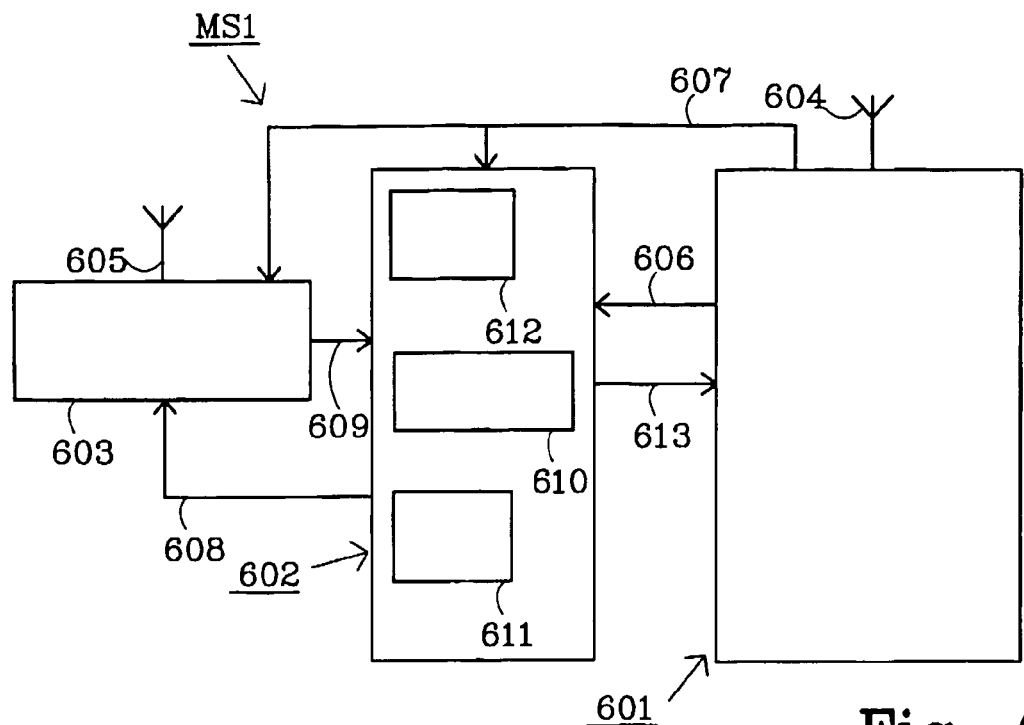
FIG. 6 is a schematic block diagram of a mobile station according to a first exemplary embodiment of the invention.

FIG. 6 is a block diagram illustrating the structure of the mobile station MS1 according to this exemplary embodiment of the invention. The mobile station MS1 includes a cellular communication module 601, a positioning module 602, a GPS RF front end 603, an antenna 604 for communication with the cellular network and a GPS antenna 605. The positioning module 602 includes a CPU 612, memory 610 and a Digital Signal Processor (DSP) 611. The cellular communication module 601 wirelessly receives assistance data from the cellular network and wirelessly transmits measurement results to the cellular network via base stations in the cellular network. The assistance data could consist of ephemeris and clock corrections for visible satellites, an approximate location of the mobile station MS1 and an approximate GPS system time. Alternatively the assistance data could contain explicit assistance data intended only for assisting the correlation processing. The communication module 601 forwards received assistance data to the positioning module 602 using the interface 606 while measurement results are provided from the positioning module 602 to the communication module 601 using interface 613. The communication module 601 also provides the GPS RF front end 603 and the positioning module 602 with a clock reference 607. The GPS RF front end module 603 is controlled by the positioning module 602 using interface 608.

Figure 7:
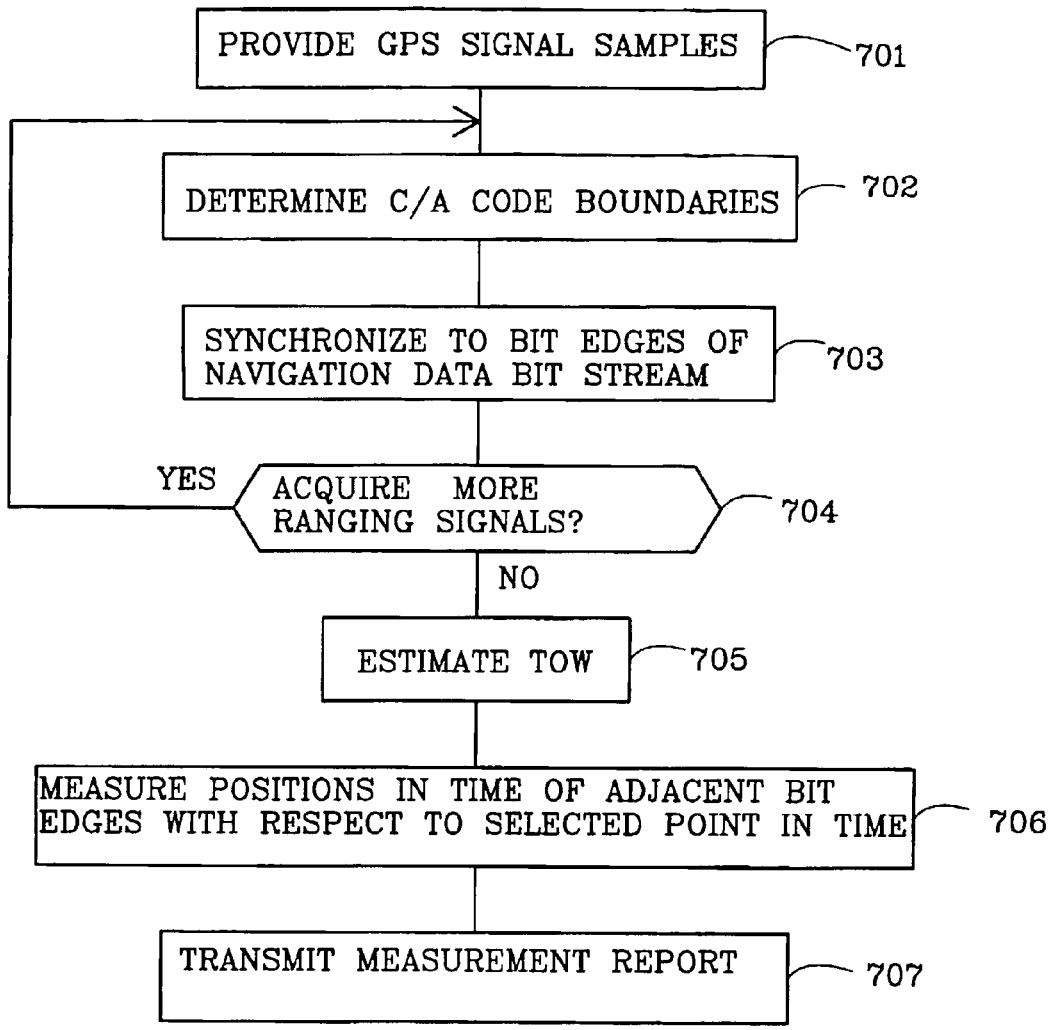
FIG. 7 is a flow diagram illustrating processing performed by the mobile station of FIG. 6.

FIG. 7 illustrates processing performed by the mobile station MS1 when it receives a positioning request.

When the positioning module 602 receives a positioning request from the communication module 601, it requests the GPS RF front end 603 to provide GPS signal samples at step 701. The GPS RF front end 603 receives the GPS frequency band through the antenna 605, downconverts the signal to baseband, separates the signal into in-phase (I) and quadrature (Q) components, samples and converts the signals into digital format, and outputs these to the positioning module 602 through interface 609. The positioning module 602 stores the received I and Q data in memory 610.

Steps 702-703 define processing performed on each individual ranging signal RS1-RS4 which is included in the measurement report transmitted at step 707. Please note that even though FIG. 7 illustrates sequential processing (see step 704) of each individual ranging signal, processing related to different ranging signals are preferably performed in parallel.

A ranging signal y as a function of time t received from an arbitrary Space Vehicle SV1-SV4 by the mobile station MS1 can in a simplified way be written:

$$y(t)=a \cdot c(t-\tau) \cdot d(t-\tau) \cdot \exp\{i \cdot (\omega_0 t + \omega_d t + \phi)\} + e(t) \quad (20)$$

Here a is the amplitude of the received signal, c(t) is the C/A code of the Space Vehicle and d(t) is the navigation data bit stream (see FIG. 2). The term τ is the unknown delay of the signal which is a function of the distance from the Space Vehicle to the position of mobile station MS1, $\omega_0$ is the GPS carrier frequency, $\omega_d$ is the Doppler frequency of the signal, $\phi$ is an unknown phase and e(t) noise.

At step 702 the C/A code boundaries of a ranging signal are determined by the Digital Signal Processor 611 in the positioning module 602 using correlation that test all possible code phase and Doppler shifts for the ranging signal.

Once the C/A code boundaries of a ranging signal have been determined at step 702, processing of said ranging signal continues at step 703 by the Digital Signal Processor 611 in order to synchronize to the bit edges of the navigation data bit stream of this ranging signal. Bit edge synchronization amounts to determine the data bit transitions of the d(t) sequence. There are several known ways of performing bit edge synchronization in the literature (see e.g. chapter 8 of [2]). One example of how bit edge synchronization could be performed would be to first despread the received data, leaving raw "pseudobits" with a bit rate of 1 ms (i.e. corresponding to each C/A code repetition). Note that there are 20 pseudobits per navigation data bit. In terms of formula (20) (and ignoring the noise component) this could be expressed as $$s(kT) = a \cdot d(kT-\tau) \cdot \exp(i\phi); \ T=0.001 \ s, k=1, 2, \ldots, N \quad (21)$$

Figure 8:
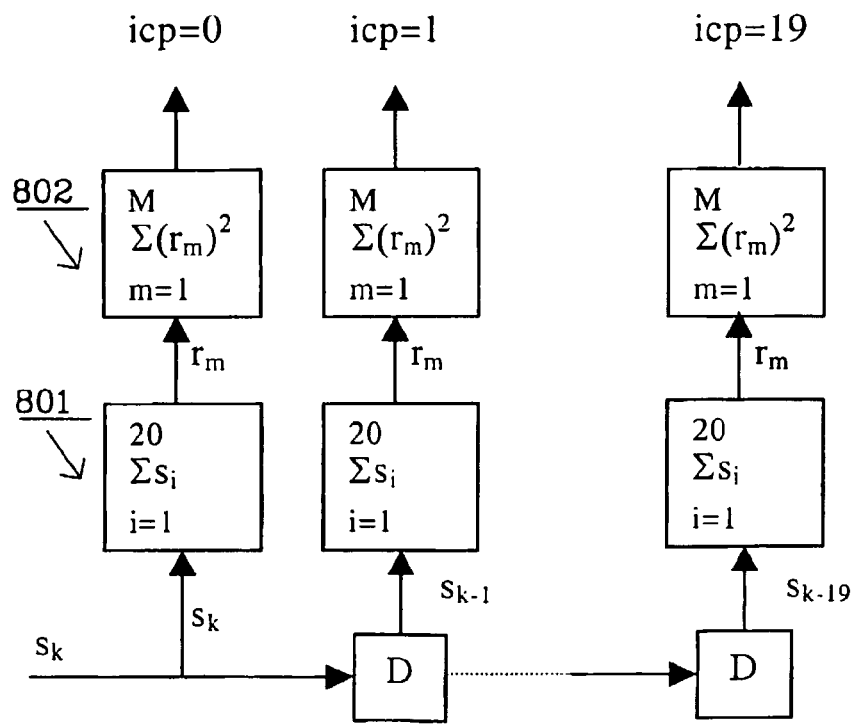
FIG. 8 is a block diagram illustrating correlation in connection with bit edge synchronization.

Then, as illustrated by FIG. 8, the pseudobits are fed into a first set of accumulators 801 that sum up twenty consecutive pseudobits. After this the sum is squared, and a new summation commences in a second set of accumulators 802. This procedure is repeated M times. M may be adapted to the current Signal-to-noise ratio or selected as a fixed value, e.g. M=50. All this is done for 20 different delays of the pseudobit sequence. The output bin, i.e. the accumulator in the second set of accumulators 802, that maximizes the accumulation sum determines the data bit edge for the Space Vehicle in question. This can be expressed as a number between 0 and 19 that will hereafter be called integer code phase ("icp"), since it counts the integer number of C/A code periods since the latest navigation data bit boundary.

Once steps 702 and 703 have been initially completed for a ranging signal, the DSP 611 maintains synchronization with said ranging signal by tracking changes in C/A code boundary/Bit edge timing of said ranging signal.

If more ranging signals need to be acquired (an alternative YES at step 704) steps 702 and 703 are repeated for a next ranging signal (as already discussed, the processing of steps 702-703 are preferably performed in parallel for several ranging signals and not sequentially as indicated by FIG. 7). The decision in step 704 on whether more ranging signals should be acquired or not could be based on the number of ranging signals acquired so far (at least 3 or preferably 4 ranging signals should be acquired, but acquiring more ranging signals would improve the precision of the calculated position) and timing requirements (the response time for providing a measurement report signal could be configured by a parameter to e.g. within 16 seconds of receiving a positioning request).

If enough ranging signals have been acquired (an alternative NO at step 704), the GPS Time Of Week (TOW) of a selected point in time is estimated at step 705. Please note that preferably, as soon as steps 702-703 have been completed for a first ranging signal, step 705 is performed based on said ranging signal in parallel with acquiring additional ranging signals.

There are several alternatives for how step 705 may be performed. Typically TOW estimation is based on determining the TOW transmitted in the so called Handover Word (HOW) of one ranging signal (see FIG. 3), preferably the first acquired ranging signal, and then compensating for the propagation delay from signal transmission by the Space Vehicle until signal reception by the mobile station MS1.

Determining the transmitted TOW can be performed by direct decoding of the transmitted TOW. This alternative implies that data is demodulated at a rate of 20 ms and normally requires that subframe boundaries are determined followed by decoding of the Handover Word, from which the TOW, ie the transmission time $t_{tr}$, can be derived. Each subframe has a length of 6 s, so this procedure may require that approximately 8 seconds of navigation data is collected.

TOW demodulation works down to approximately −172 dBW, assuming 0 dB antenna and is in fact the limiting factor for detection sensitivity.

Alternatively, the transmitted TOW can be determined by reconstruction using correlation techniques. This procedure also requires that demodulated data bits are generated, but instead of direct decoding, correlation is made with known transmitted navigation data bits (e.g. the contents of the so-called Telemetry Word and the HOW word which may be sent to the mobile station as part of the assistance data). This requires that the GPS time is a priori known to within a few seconds. This procedure works to somewhat lower signal levels than direct TOW decoding, but most likely the performance is limited by the tracking loops that may loose lock at such low signal levels. Typically phase locked loops or automatic frequency control loop are employed for this. But it is expected that this will work down to say −179 dBW.

Compensating for the propagation delay could be performed by applying an expected average propagation delay of 77 ms. Alternatively a more accurate propagation delay compensation can be derived from assistance data received from the cellular network by the mobile station MS1 according to the principles elaborated in copending US patent application by inventors Ari Kangas and Janos Toth-Egetö filed Sep. 29, 2004.

At step 706, the positions in time with respect to the selected point in time are measured for navigation data bit edges adjacent to the selected point in time in each acquired ranging signal. More specifically, for each acquired ranging signal, the position of the closest bit edge preceding the selected point in time is measured at step 706 by registering the number of whole and fractional chips from the selected point in time until the next C/A code boundary and additionally the integer number of C/A code periods between the selected point in time and the closest preceding navigation data bit edge. By measuring the C/A code phase shifts (whole and fractional chips) and the integer C/A code phase (number of C/A code repetitions), each ranging signal phase is thus determined modulo the navigation data bit length (i.e. 20 ms).

Finally, at step 707 a measurement report signal is wirelessly transmitted by the mobile station MS1 to the cellular network NET1.

FIG. 10 illustrates schematically an exemplary format for the measurement report signal 1001 used in this exemplary embodiment of the invention. Please note that FIG. 10 provides a simplified view focusing on data that is relevant for the present invention and the measurement report signal would include additional data not illustrated in FIG. 10 (e.g. as specified for the MEASURE POSITION RESPONSE message according to 3GPP TS 44.031 or the MEASUREMENT REPORT message according to 3GPP TS 25.331)

The measurement report signal 1001 includes the following data for each measured ranging signal:
Satellite ID 1002 identifying the particular satellite for which the measurement data is valid.
the number of whole chips 1003 and fractional chips 1004 from the selected point in time until the next C/A code boundary;
the integer number of C/A code periods 1005 between the selected point in time and the closest preceding navigation data bit edge.
The measurement report signal also includes the estimated TOW 1006 at the selected point in time.

The measurement report signal is in the first exemplary embodiment of the invention transmitted as ordinary user data in the user plane addressed to the location server 101. Hence the measurement report signal is transparently routed through the cellular network NET1 via the IP based network 102 to the location server 101.

Figure 9:
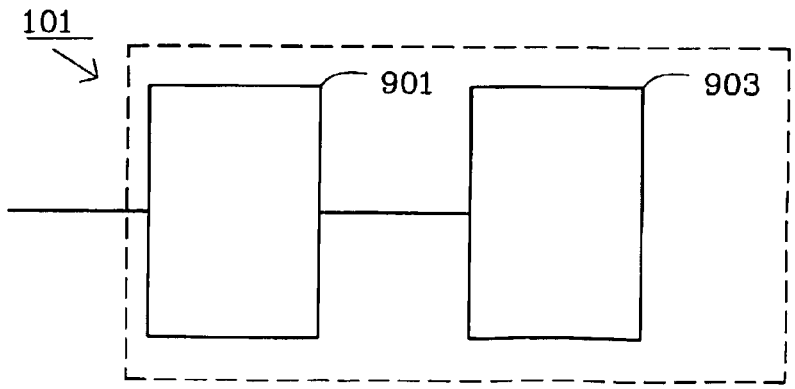
FIG. 9 is a schematic block diagram of a location server.
Figure 10:
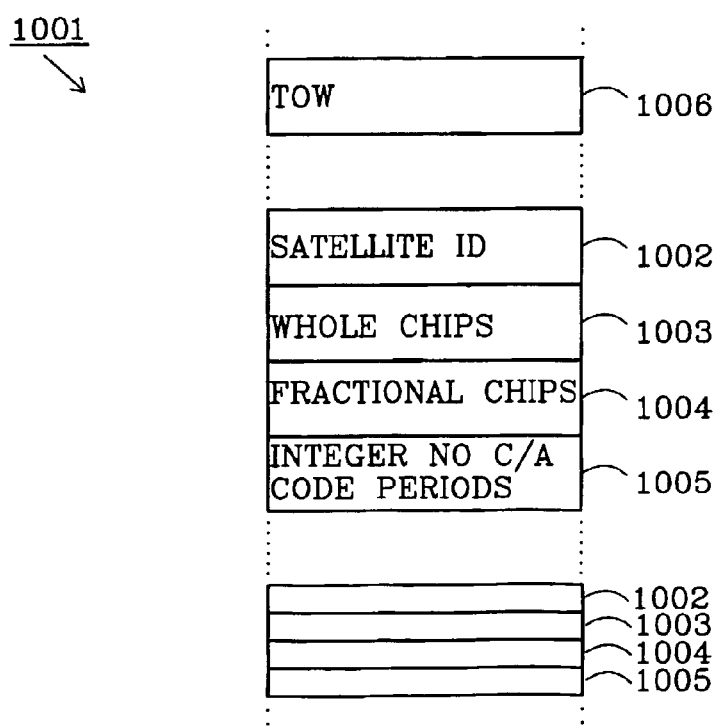
FIG. 10 is a block diagram illustrating an exemplary embodiment of a measurement report signal format

FIG. 9 schematically illustrates the structure of the location server 101. The location server includes a communication module 901 and a positioning module 903. The communication module 901 receives the measurement report and forwards measurement data to the positioning module 903. The positioning module 903 calculates the location of the mobile station MS1 using the provided measurement data (including the measured timing information for each reported ranging signal) and apriori information on the mobile station location. The apriori information can e.g. be derived from a Public Land Mobile Network (PLMN) identity included in the signal from the mobile station MS1 and indicating in which network the mobile station MS1 is operating. The PLMN identity could e.g. be included as part of the cell identity of the cell in which the mobile station is currently operating. Using the provided PLMN identity, the positioning module 903 could derive the apriori location information e.g. by retrieving the coordinates of the centre of the country in which the mobile station MS1 is operating, together with a radius corresponding to the maximum distance from said centre until the border of said country from a table. The hierarchical nature of cell identities could also be exploited, in particular for large countries, to identify a particular region within a country in which the mobile station is operating. Maintaining a table of centre/radius information for different countries, or regions within said countries, is significantly less burdensome than trying to maintain a global data base with information on the geographical coordinates of each cell.

In the exemplary first embodiment of the invention, the positioning module 602 of the mobile station MS1 functions both as synchronizing means for synchronizing to data bit edges in the stream of data bits on received ranging signals as well as measuring means for measuring the positions of the stream of data bits on the received ranging signals with respect to a selected point in time, while the cellular communication module 601 functions as transmitting means for wirelessly transmitting signals including data representing said measured positions in time. In the location server 101, the communication module 901 functions as means for receiving measurement report signals including said measured positions in time while the positioning module 903 functions as means for calculating mobile station positions based on the received measurement results.

Apart from the exemplary first embodiment of the invention disclosed above, there are several ways of providing rearrangements, modifications and substitutions of the first embodiment resulting in additional embodiments of the invention.

An exemplary embodiment for use in the context of mobile station based AGPS could be derived from the illustrated first embodiment of the invention by essentially replacing step 707 of FIG. 7 with a step of calculating the position of the mobile station MS1 in the positioning module 602 of the mobile station MS1. Thus the calculations performed by positioning module 903 of the location server 101 in the first exemplary embodiment would instead be performed by positioning module 602 of the mobile station MS1. An apriori estimate of the mobile station position together with satellite ephemeris data and clock corrections would be provided by the network as assistance data for use in the position calculations.

The invention could of course be applied both in the context of control plane and user plane solutions to AGPS. As regards control plane solutions to AGPS, the invention is probably most interesting to apply in the context of extended range cells (in GSM, extended range cells could have a radius of up to 100 km) or when cell identity positioning (which typically is used as a basis for determining apriori location information) is not implemented in a network. Applying the invention in control plane solutions to mobile assisted AGPS would imply modifications of signaling messages used to report measurement results from mobile stations in order to include data defining the measured ranging signal phases modulo the navigation data bit length (i.e. 20 ms). This could preferably be achieved by adding the integer number of C/A code periods from the closest preceding navigation data bit edge as suggested for the measurement report signal of the first exemplary embodiment. Examples of signaling messages that need to be modified are the MEASURE POSITION RESPONSE message specified in 3GPP TS 44.031 and the MEASUREMENT REPORT message specified in 3GPP TS 25.331.

There are of course several alternatives for how measured positions of time modulo the data bit length of data bit streams in ranging signals could be represented in a measurement report signal apart from the format suggested above and in FIG. 10. One alternative would be to include the integer number of C/A code periods to the closest bit edge following the selected point in time. Another alternative would be to translate the integer number of code repetitions together with the number of whole and fractional chips into time expressed in whole and fractional milliseconds.

By using real time clocks of sufficient precision, e.g. the cellular system clocks that typically drift only a few nanoseconds per second and have a long term stability better than 1 ms for a significant time, Time Of Week estimation would not require decoding/reconstructing TOW transmitted in a ranging signal for each positioning request. Also, an alternative to performing TOW estimation would be to measure an additional ranging signal for estimating the unknown ranging signal reception time and, for mobile station assisted AGPS, include data for the additional ranging signal in the measurement report signal instead of a TOW estimate.

In situations where it would be desirable to handle even larger apriori location uncertainties than 1500 km in connection with AGPS, the present invention could be combined with the teachings of U.S. Patent Application No. 60/545,175 by performing measurements modulo the navigation data bit length on received ranging signals as specified in this application and then eliminating unlikely pseudoranges as disclosed in said US patent application.

Even though the invention in its first exemplary embodiment has been applied in the context assisted GPS, the invention may of course be applied in connection with other satellite based positioning systems where the transmitted ranging signals includes data bits spread by a spreading code.

APPENDIX 1

This appendix illustrates why apriori location uncertainties of more than 75 km, imply that pseudoranges can not be unambiguously reconstructed due to the 1 ms truncation of prior art AGPS.

Figure 11:
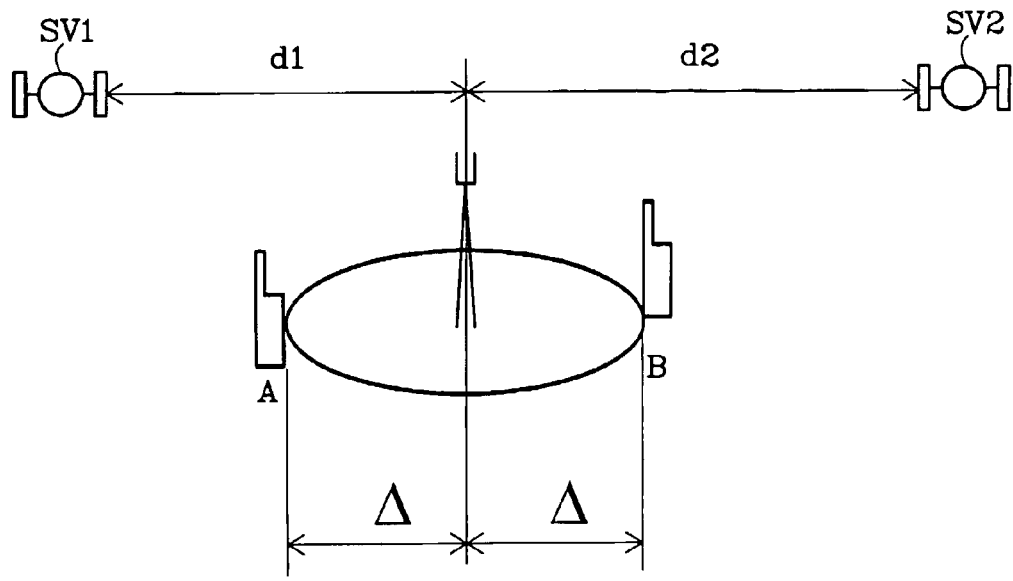
FIG. 11 illustrates a worst case scenario for deriving a boundary for the initial location uncertainty which prior art AGPS can handle in order to still provide unambiguous pseudorange reconstruction.

FIG. 11 illustrates a worst case scenario where a mobile station measures the complete clock tsv1 of a first Space Vehicle SV1, i.e. performs complete TOW reconstruction of the ranging signal received from Space Vehicle SV1, and the fractional (submillisecond) part of a second Space Vehicle SV2 clock tsv2, i.e. only determines the C/A code phase for the ranging signal received from Space Vehicle SV2. The mobile station is known to be located within a circle, e.g. corresponding to the cell boundary of a serving cell, having a radius $\Delta$, i.e. the apriori location uncertainty of the mobile station is $\Delta$. The distance from Space Vehicle SV1 to the centre of the circle is d1 while the distance from Space Vehicle SV2 to the centre of the circle is d2. The measurement is done at (the unknown) time t0. The question is now: Under what conditions is it possible to reconstruct unambiguously the integer millisecond part of the clock tsv2?

Clocks tsv1 and tsv2 at the tentative mobile station locations A and B are now calculated:

At A:

$$tsv1 = t0 - (d1 - \Delta)/c \quad (1)$$

$$tsv2 = t0 - (d2 + \Delta)/c \quad (2)$$

where c is the speed at which radio signals propagates in vacuum.

Subtracting (1) from (2) and rearranging, results in $$tsv2 = tsv1 + (d1 - d2 - 2\Delta)/c \quad (3)$$

At B:

$$tsv1 = t0 - (d1 + \Delta)/c \quad (4)$$

$$tsv2 = t0 - (d2 - \Delta)/c \quad (5)$$

Subtracting (4) from (5) and rearranging, results in $$tsv2 = tsv1 + (d1 - d2 + 2\Delta)/c \quad (6)$$

Combining (3) and (6) it follows that tsv2 lies in the interval $$tsv2 \in (tsv1 + (d1 - d2 - 2\Delta)/c, tsv1 + (d1 - d2 + 2\Delta)/c) \quad (7)$$

The size of this interval is $4\Delta/c$. In order to reconstruct the integer millisecond part of tsv2 unambiguously, it is required that the interval is less than 1 ms. Hence $$4\Delta/c < 0.001 \quad (8)$$

which leads to the requirement $$\Delta < c*0.001/4 \sim 75 \text{ km} \quad (9)$$

REFERENCES

[1] Navstar GPS Space Segment/Navigation user Interfaces, ICD-GPS-200, Revision IRN-200C-003, 11 Oct. 1999.
[2] Parkinson, Spilker Global Positioning System: Theory and Applications, Volume 1, AIAA, 1996.

The invention claimed is:
1. A method in a mobile station for reporting measurements on ranging signal received by the mobile station from satellites, said ranging signals each comprising a stream of data bits spread by a spreading code, said method including the steps of for at least one of the received ranging signals:
   synchronizing the mobile station to data bit edges in the stream of data bits, wherein
      the synchronizing further comprises
         identifying data bit edge positions modulo a data bit length;
   measuring, by the mobile station, a position in time modulo the data bit length for the stream of data bits with respect to a selected point in time, wherein
      said measuring comprises determining the position in time with respect to said selected point in time for an adjacent bit edge in the stream of data bits by registering a number of whole and fractional chips from said selected point in time until a next course/acquisition (C/A) code boundary and an integer number of C/A code periods between said selected point in time and a closest preceding navigation bit edge; and transmitting a signal including data representing said measured position in time.

2. A method according to claim 1, wherein said synchronizing and measuring steps are performed for plural received ranging signals and said wirelessly transmitted signal includes data representing the measured positions in time with respect to said selected point in time for each of said plural received ranging signals.

3. A method according to claim 1, wherein said adjacent bit edge is the closest following bit edge after said selected point in time.

4. A method according to claim 1, wherein said adjacent bit edge is the closest bit edge preceding said selected point in time.

5. A method according to claim 1, wherein the satellites are part of the Global Positioning System.

6. A method according to claim 5, wherein said spreading codes are Coarse Acquisition codes and the streams of data bits are streams of Navigation data bits according to the format of the Global Positioning System specifications.

7. A method according to claim 6, wherein said step of synchronizing includes the substeps of:
determining Coarse Acquisition code boundaries;
determining navigation data bit edges.

8. A method in a mobile station for calculating the mobile station position based on measurements on ranging signals received by the mobile station from satellites, said ranging signals each comprising a stream of data bits spread by a spreading code, said method including the steps of for at least one of the received ranging signals:
synchronizing the mobile station to data bit edges in the stream of data bits, wherein
the synchronizing further comprises
identifying data bit edge positions modulo a data bit length;
measuring, by the mobile station, a position in time modulo the data bit length for the stream of data bits with respect to a selected point in time;
calculating said mobile station position utilizing said measured position in time for said stream of data bits with respect to said selected point in time and assistance data received by the mobile station via at least one base station of a wireless communication network.

9. A method according to claim 8, wherein said synchronizing and measuring steps are performed for plural received ranging signals and said position calculation is performed utilizing the measured positions in time with respect to said selected point in time for each of said plural received ranging signals.

10. An apparatus for performing measurements on ranging signals received by a mobile station from satellites, said ranging signals each comprising a stream of data bits spread by a spreading code, said apparatus including:
synchronizing means for synchronizing a mobile station to data bit edges in the stream of data bits of at least one received ranging signal, wherein
the synchronizing comprises identifying data bit edge positions modulo a data bit length;
measuring means for measuring a position in time modulo the data bit length for the stream of data bits of said at least one received ranging signal with respect to a selected point in time, wherein
said measuring means are adapted to determine the position in time with respect to said selected point in time for an adjacent bit edge in the stream of data bits by registering a number of whole and fractional chips from said selected point in time until a next coarse/acquisition (C/A) code boundary and an integer number of C/A code periods between said selected point in time and a closest preceding navigation data bit edge, and
transmitting means for transmitting a signal including data representing said measured position in time.

11. An apparatus according to claim 10, wherein said synchronizing and measuring means are adapted to operate on plural received ranging signals and said transmitting means are adapted to include data in said signal representing the measured positions in time with respect to said selected point in time for each of said plural received ranging signals.

12. An apparatus according to claim 10, wherein said adjacent bit edge is the closest following bit edge after said selected point in time.

13. An apparatus according to claim 10, wherein said adjacent bit edge is the closest bit edge preceding said selected point in time.

14. An apparatus according to, claim 10, wherein the satellites are part of the Global Positioning System.

15. An apparatus according to claim 14, wherein said spreading codes are Coarse Acquisition codes and the streams of data bits are streams of Navigation data bits according to the format of the Global Positioning System specifications.

16. A mobile station including an apparatus according to claim 10.

17. An apparatus for calculating a position of a mobile station based on measurements on ranging signals received by the mobile station from satellites, said ranging signals each comprising a stream of data bits spread by a spreading code, said apparatus including:
synchronizing means for synchronizing a mobile station to data bit edges in the stream of data bits of at least one received ranging signal, wherein
the synchronizing comprises identifying data bit edge positions modulo a data bit length;
measuring means for measuring a position in time modulo the data bit length for the stream of data bits of said at least one received ranging signal with respect to a selected point in time,
calculating means for calculating said position of the mobile station utilizing said measured position in time for said stream of data bits with respect to said selected point in time and assistance data received by the mobile station via at least one base station of a wireless communication network.

18. An apparatus according to claim 17, wherein said synchronizing and measuring means are adapted to operate on plural received ranging signals and said calculating means are adapted to utilize the measured positions in time with respect to said selected point in time for each of said plural received ranging signals.

* * * * *